(12) United States Patent
Xu et al.

(10) Patent No.: US 8,764,241 B2
(45) Date of Patent: Jul. 1, 2014

(54) RING LIGHT SOURCE SYSTEM FOR INTERFEROMETER WITH ADJUSTABLE RING RADIUS AND RING RADIAL WIDTH

(75) Inventors: Yan Xu, Sichuan (CN); Yongjian Wan, Sichuan (CN); Yongqian Wu, Sichuan (CN)

(73) Assignee: Institute of Optics and Electronics, Chinese Academy of Sciences, Sichuan (CN)

( * ) Notice: Subject to any disclaimer, the term of this patent is extended or adjusted under 35 U.S.C. 154(b) by 183 days.

(21) Appl. No.: 13/558,572

(22) Filed: Jul. 26, 2012

(65) Prior Publication Data
US 2013/0027942 A1 Jan. 31, 2013

(30) Foreign Application Priority Data
Jul. 27, 2011 (CN) .......................... 2011 1 0211500

(51) Int. Cl.
*F21S 8/00* (2006.01)

(52) U.S. Cl.
USPC ........... 362/268; 356/512; 362/259; 362/281; 362/293; 362/319

(58) Field of Classification Search
USPC ................. 362/259, 268, 279–281, 293, 319; 356/512
See application file for complete search history.

(56) References Cited

U.S. PATENT DOCUMENTS

| 6,924,898 B2 * | 8/2005 | Deck .............................. 356/512 |
| 2003/0030819 A1 | 2/2003 | Kuechel |

* cited by examiner

*Primary Examiner* — Stephen F Husar
(74) *Attorney, Agent, or Firm* — Knobbe, Martens, Olson & Bear, LLP

(57) ABSTRACT

A ring light source system for an interferometer with adjustable ring radius and ring radial width may comprise a laser light source, an expander and collimator optical system, an adjustable aperture, a binary phase grating, a variable-focus optical system, and a spatial filter. The expander and collimator optical system is configured to convert a light beam from the light source into a parallel light beam. The adjustable aperture is configured to adjust a diameter of the parallel light beam. The light beam with the diameter adjusted by the adjustable aperture is incident perpendicularly onto the binary phase grating, followed by the variable-focus optical system. The filter is positioned on a back focal plane of the variable-focus optical system, and is configured to receive a ring light source. The ring radius and radial width of the light source are adjustable by adjusting a focus length f1 of the variable-focus optical system.

6 Claims, 2 Drawing Sheets

RING LIGHT SOURCE SYSTEM FOR INTERFEROMETER WITH ADJUSTABLE RING RADIUS AND RING RADIAL WIDTH

CROSS-REFERENCE TO RELATED APPLICATIONS

This application claims the benefit of Chinese Application No. 201110211500.6 filed Jul. 27, 2011, which is hereby expressly incorporated by reference in its entirety.

TECHNICAL FIELD

The present disclosure relates to the optics field, especially, the optical test and instrument field, and more particularly, to an illumination system for an interferometer.

BACKGROUND

Light sources for interferometers need to meet certain requirements in terms of temporal coherence and spatial coherence for various applications, while outputting sufficient power. Before laser devices, atomic spectrum lamps such as sodium lamps and mercury lamps were generally used as the light sources for the interferometers. Such light sources emit radiations with spectral components at discontinuous and discrete wavelengths. To meet the requirements on temporal coherence and spatial coherence, it is common to filter out unwanted spectral components with a filter sheet and to limit a light source in dimension with an aperture following the light source. However, the atomic spectrum lamps are generally extended light sources. Thus, the aperture following the light source will significantly reduce effective energy entering the interferometer from the light source, so that it is difficult to observe bright interference fringes on an observing screen. This prevents accurate measurements by the interferometer. Such problems are completely solved by the laser devices. The laser has excellent temporal coherence and spatial coherence, and thus has a coherence length that other types of light sources cannot achieve. Due to the excellent spatial coherence, the laser has a broad coherent region in space, implying that limitation by an aperture following the light source is not needed any more. The laser has highly concentrated energy density, resulting in sufficiently bright interference fringes. Therefore, the laser light sources have become most desirable ones for the interferometry.

In laser interferometers, coherent noises will influence the accuracy of data processing on interference patterns. The coherent noises can be caused by undesired reflection, diffraction, and scattering. The diffraction may result from dust particles, rough surfaces, and scratched surfaces. Because the He—Ne laser light source has excellent coherence, interference fringes detected by a CCD comprises not only those due to interference between a reference beam and a test beam, but also stray fringes due to interference between stray light beams reflected by respective optical surfaces in the light path and the reference and test beams, resulting in a degraded interference pattern and a reduced system transfer function. To address the issue, sometimes low-coherence light sources or white light sources are used for the interferometers, or a rotating ground glass may be incorporated into an imaging system, to reduce the spatial coherence. However, the spatially extended light sources will significantly reduce the contrast of the interference fringes and the signal-to-noise ratio of the interferometers.

SUMMARY

The present disclosure aims to overcome, at least in part, the problems existing in the prior art. To this end, there is provided a ring light source system for an interferometer with adjustable ring radius and ring radial width. Due to the adjustable ring radius and ring radial width, it is possible to effectively suppress coherent noises in the interferometer, resulted in enhanced accuracy of the interferometer.

According to one aspect of the present disclosure, there is provided a ring light source system for an interferometer with adjustable ring radius and ring radial width, comprising a laser light source, an expander and collimator optical system, an adjustable aperture, a binary phase grating, a variable-focus optical system, and a spatial filter. The expander and collimator optical system is configured to convert a light beam from the laser light source into a parallel light beam. The adjustable aperture is configured to adjust a diameter of the parallel light beam. The light beam with the diameter adjusted by the adjustable aperture is incident perpendicularly onto the binary phase grating, followed by the variable-focus optical system. The spatial filter is positioned on a back focal plane of the variable-focus optical system, and is configured to receive a ring light source. The ring radius and the ring radial width of the ring light source are adjustable by adjusting a focus length f1 of the variable-focus optical system.

The binary phase grating may comprise an equidistant binary phase grating, satisfying $2h(n-1)=\lambda$, where h indicates a groove depth of the phase grating, n indicates a refractive index of the phase grating, and $\lambda$ indicates a wavelength of the incident light. In this case, the binary phase grating has diffraction light at all even orders in an extinct state. That is, the diffraction efficiency of the even orders is about zero. Light energy at odd orders is concentrated in $\pm 1$ orders, with a diffraction efficiency of about 40.5%. In this way, it is possible to efficiently utilize the light energy and to filter out stray light at higher orders.

An optical aperture may be provided at a focusing point of the expander and collimator optical system to filter out stray light.

The binary phase grating can be positioned so that a rotation axis thereof coincides with the middle of a grating period, where the grating is located with respect to the axis so that it is an "even function," in order not to introduce a phase-term in its Fourier transformation.

The laser light source may comprise a He—Ne frequency stabilized laser light source.

The variable-focus optical system has its focus variable in a step mode or a continuous mode.

The spatial filter may comprise an annular glass plate coated with an opaque film.

The system may operate as follows. A light beam emitted from the laser light source 101 may be converted into a parallel light beam by the expander and collimator optical system 102, with stray light removed by means of the pin-hole filter (103) provided at the focusing point of the expander and collimator optical system 102. The parallel light beam then passes through the variable aperture 104. The aperture 104 is variable to adjust the diameter of the light beam to be incident on the binary phase grating. The grating 105 may comprise an equidistant binary phase grating, in which case, the diffraction efficiency of the even orders is about zero, and the light energy at the odd orders is concentrated in $\pm 1$ orders, with a diffraction efficiency of about 40.5%. When the parallel light beam is incident perpendicularly on the binary phase grating which is rotating around the optical axis, the spatial filter 107 positioned on the back focal plane of the variable-focus optical system 106 will receive the ring light source, while filtering out spray light at higher orders from the binary phase grating. The spatial filter 107 may be positioned in a confocal plane of the variable-focus optical system 106 and a back collimator lens 108. It is possible to adjust the ring radius of the ring light source received by the spatial filter 107 by adjusting the focus length $f_1$ of a lens assembly included in the variable-focus optical system 106. Specifically, the ring radius is increased as the focus length of the lens assembly is increased.

The present disclosure can provide various advantages over the prior art.

For example, according to the present disclosure, it is possible to adjust the ring radius and the ring radial width by adjusting the diameter of the incident light beam and/or adjusting the focus length of the variable-focus optical system. As a result, the ring light source can be used for illumination of high-accuracy interferometers, and facilitates suppression of coherent noises in the interferometers. The ring light source is particularly advantageous in improving the signal to noise ratio and the accuracy of the interferometers.

Further, the ring light source according to the present disclosure utilizes the binary phase ring, resulting in easy manufacture, low cost, and high utilization of the light energy.

BRIEF DESCRIPTION OF THE DRAWINGS

In FIG. 1, 101 indicates a laser light source, 102 indicates an expander and collimator optical system, 103 indicates a pin-hole filter, 104 indicates an adjustable aperture, 105 indicates a binary phase grating, 106 indicates a variable-focus optical system, 107 indicates a spatial filter, and 108 indicates a collimator lens.

DETAILED DESCRIPTION

Figure 1:
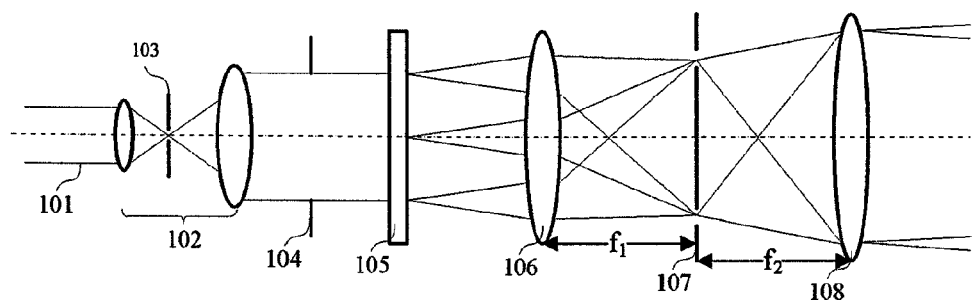
FIG. 1 is a principle diagram schematically showing a ring light source system according to an embodiment of the present disclosure.
Figure 2:
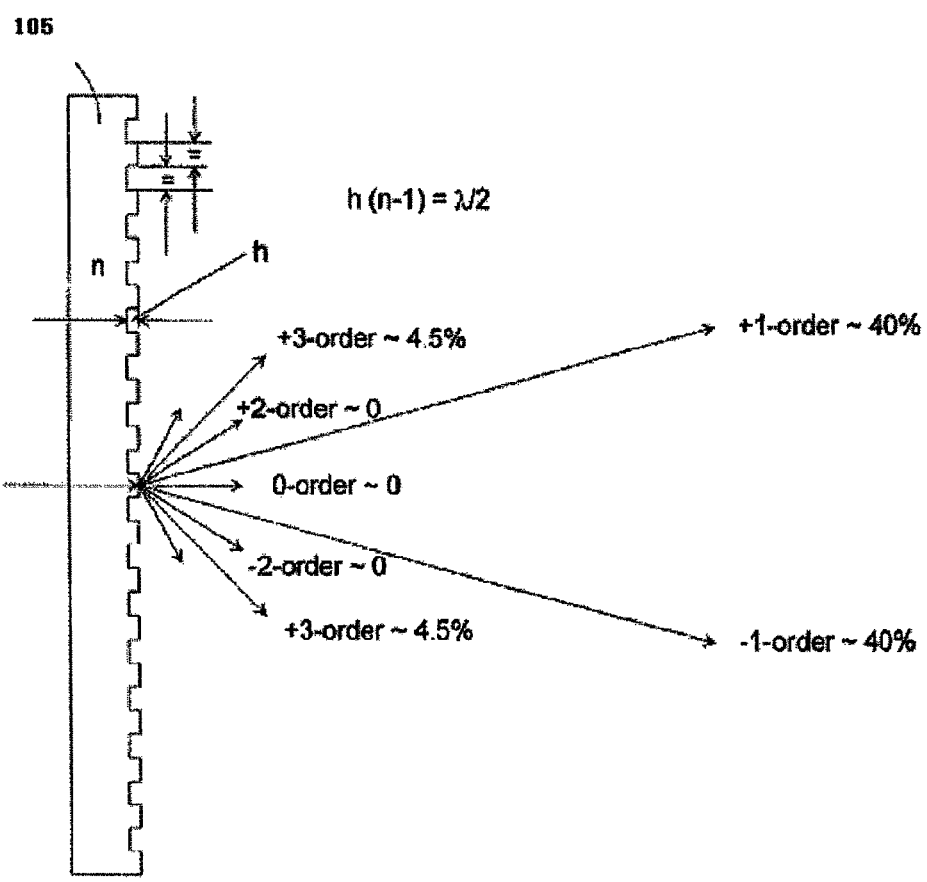
FIG. 2 is a side view schematically showing a binary phase grating.

As shown in FIG. 1, a light source 101, such as a He—Ne frequency stabilized laser light source, may emit a laser light beam. The light beam may be converted into a parallel light beam by an expander and collimator optical system 102, optionally with stray light removed by means of a pin-hole filter 103 provided at a focusing point of the expander and collimator optical system 102. The parallel light beam then passes through a variable aperture 104. The aperture 104 is variable to adjust a diameter of the light beam to be incident on a phase grating 105. For example, as shown in FIG. 2, the phase grating 105 may comprise an equidistant binary phase grating, satisfying $2h(-1)=\lambda$, where h indicates a groove depth of the phase grating, n indicates a refractive index of the phase grating, and $\lambda$ indicates a wavelength of the incident light. When the parallel light beam is incident perpendicularly on the phase grating which is rotating around the optical axis, a spatial filter 107 positioned on a back focal plane of the variable-focus optical system 106 will receive a ring light source. The spatial filter may comprise an annular glass plate coated with an opaque film. It is possible to adjust the ring radius of the ring light source received by the spatial filter 107 by adjusting the focus length $f_1$ of a lens assembly included in the variable-focus optical system 106. Specifically, the ring radius is increased as the focus length of the lens assembly is increased.

As shown in FIG. 2, the binary phase grating may comprise an equidistant binary phase grating, satisfying $2h(n-1)=\lambda$, where h indicates the groove depth of the phase grating, n indicates the refractive index of the phase grating, and $\lambda$ indicates the wavelength of the incident light. The phase grating has a diffraction efficiency of about zero at even orders, and has light energy at odd orders concentrated in ±1 orders, with a diffraction efficiency of about 40.5%.

Figure 3:
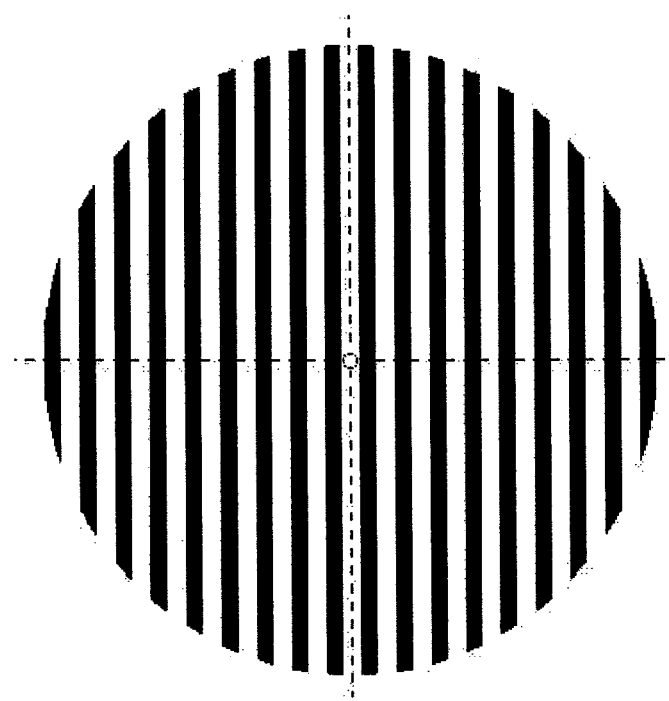
FIG. 3 is a diagram schematically showing positioning of a rotation axis of the phase grating.
Figure 4:
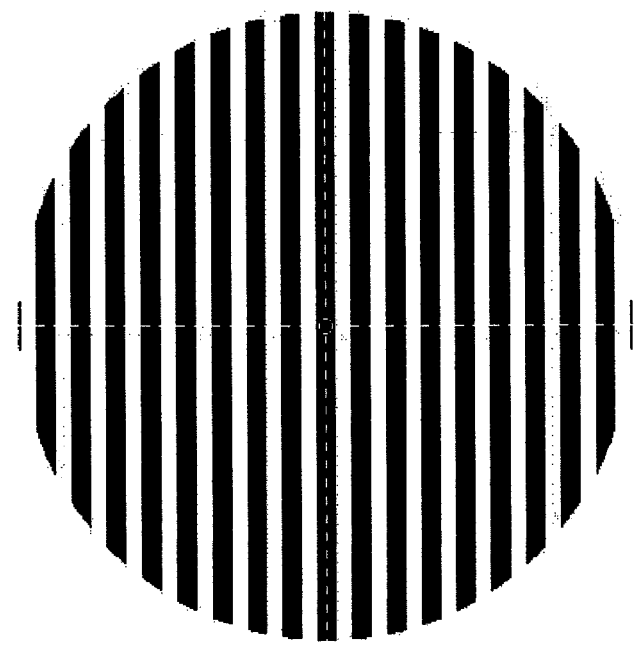
FIG. 4 is a diagram schematically showing positioning of a rotation axis of the phase grating.

As shown in FIG. 3 or 4, the binary phase grating can be positioned so that a rotation axis thereof coincides with an optical axis of the optical systems, the rotation axis passing through the middle of a grating period. As a result, it is possible to prevent rotation of the grating from introducing phase change(s) into the diffraction light at the two orders.

We claim:

1. A ring light source system for an interferometer with adjustable ring radius and ring radial width, comprising a laser light source, an expander and collimator optical system, an adjustable aperture, a binary phase grating, a variable-focus optical system, and a spatial filter, wherein
    the expander and collimator optical system is configured to convert a light beam from the laser light source into a parallel light beam,
    the adjustable aperture is configured to adjust a diameter of the parallel light beam,
    the light beam with the diameter adjusted by the adjustable aperture is incident perpendicularly onto the binary phase grating, followed by the variable-focus optical system,
    the spatial filter is positioned on a back focal plane of the variable-focus optical system, and is configured to receive a ring light source, and
    the ring radius and the ring radial width of the ring light source are adjustable by adjusting a focus length f1 of the variable-focus optical system.

2. The ring light source system according to claim 1, wherein the binary phase grating comprises an equidistant binary phase grating, satisfying $2h(n-1)=\lambda$, where h indicates a groove depth of the phase grating, n indicates a refractive index of the phase grating, and $\lambda$ indicates a wavelength of the incident light.

3. The ring light source system according to claim 1, wherein the binary phase grating is positioned so that a rotation axis thereof coincides with an optical axis of the optical systems, the rotation axis passing through the middle of a period of the grating.

4. The ring light source system according to claim 1, wherein the variable-focus optical system has its focus variable in a step mode or a continuous mode.

5. The ring light source system according to claim 1, wherein the spatial filter comprises an annular glass plate coated with an opaque film.

6. The ring light source system according to claim 1, wherein the spatial filter is positioned in a confocal plane of the variable-focus optical system and a back collimator lens.

* * * * *